United States Patent
Li

(10) Patent No.: US 11,503,534 B2
(45) Date of Patent: Nov. 15, 2022

(54) METHOD AND APPARATUS FOR CONTROLLING NETWORK ACCESS

(71) Applicant: BEIJING XIAOMI MOBILE SOFTWARE CO., LTD., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 65 days.

(21) Appl. No.: 17/049,005

(22) PCT Filed: Apr. 19, 2018

(86) PCT No.: PCT/CN2018/083786
§ 371 (c)(1),
(2) Date: Oct. 19, 2020

(87) PCT Pub. No.: WO2019/200591
PCT Pub. Date: Oct. 24, 2019

(65) Prior Publication Data
US 2021/0243677 A1  Aug. 5, 2021

(51) Int. Cl.
*H04W 48/06* (2009.01)
*H04W 48/16* (2009.01)
(Continued)

(52) U.S. Cl.
CPC .......... *H04W 48/06* (2013.01); *H04W 48/16* (2013.01); *H04W 72/0453* (2013.01);
(Continued)

(58) Field of Classification Search
None
See application file for complete search history.

(56) References Cited

U.S. PATENT DOCUMENTS 10,694,409 B2 * 6/2020 Ryu ................ H04L 5/0048
2015/0223185 A1  8/2015 Harris et al.
(Continued)

FOREIGN PATENT DOCUMENTS

CN  104519576 A  4/2015
CN  104704898 A  6/2015
(Continued)

OTHER PUBLICATIONS

European Patent Office, Extended European Search Report Issued in Application No. 18915324.0, dated Apr. 1, 2021, (12p).
(Continued)

*Primary Examiner* — Hong S Cho
(74) *Attorney, Agent, or Firm* — Arch & Lake LLP

(57) ABSTRACT

The present disclosure provides a method and an apparatus for controlling network access. According to the method, a target type carrier carrying traffic to be transmitted is determined when a traffic request is to be initiated, where the target type carrier includes a supplementary uplink (SUL) carrier, or a non-SUL carrier, Target AC configuration information applicable to the target type carrier is determined according to access control AC configuration information issued by a base station. It is determined whether the user equipment is allowed to perform an AC process through the target uplink carrier by matching the target AC configuration information against access detection information of the user equipment.

15 Claims, 9 Drawing Sheets

Determine a target type carrier carrying traffic to be transmitted when a traffic request is to be initiated — 11

Determine target AC configuration information applicable to the target type carrier according to AC configuration information issued by a base station — 12

Determine whether the user equipment is allowed to perform an AC process through the target uplink carrier by matching the target AC configuration information against access detection information of the user equipment — 13

(51) Int. Cl.
  *H04W 72/04* (2009.01)
  *H04W 72/12* (2009.01)
  *H04B 17/318* (2015.01)
  *H04W 72/14* (2009.01)

(52) U.S. Cl.
  CPC ... *H04W 72/1252* (2013.01); *H04W 72/1257* (2013.01); *H04W 72/1268* (2013.01); *H04W 72/14* (2013.01); *H04B 17/318* (2015.01)

(56) References Cited

U.S. PATENT DOCUMENTS

| | | |
|---|---|---|
| 2018/0084550 A1 | 3/2018 | Chen et al. |
| 2019/0215749 A1* | 7/2019 | Shih ...................... H04W 36/30 |

FOREIGN PATENT DOCUMENTS

| | | |
|---|---|---|
| CN | 106255212 A | 12/2016 |
| CN | 107734712 A | 2/2018 |
| WO | 2010068487 A1 | 6/2010 |
| WO | 2018054305 A1 | 3/2018 |

OTHER PUBLICATIONS

Vivo, "Other aspects on carrier aggregation", 3GPP TSG RAN WG1 Meeting 91, Reno, USA,R1-1719801, Nov. 27-Dec. 1, 2017, (5p).

CMCC,"Considerations on support of supplementary uplink frequency", 3GPP TSG-RAN WG2 Meeting #99bis, Prague, Czech, R2-1711824, Oct. 9-13, 2017, (6p).

ZTE, Sanechips,"Discussion on SUL carrier", 3GPP TSG RAN WG1 Meeting #99bis, Prague, Czech,R2-1711841, Revision of R2-1710899, Oct. 9-13, 2017, (6p).

ISA State Intellectual Property Office of the People's Republic of China, Written Opinion of the International Searching Authority Issued in Application No. PCT/CN2018/083786, dated Sep. 17, 2018, (8p).

International Search Report Issued in Application No. PCT/CN2018/083786 dated Sep. 17, 2018 with English translation (4p).

Nokia, et al., "Access Attempt Categorization and Barring Check", 3GPP TSG-RAN WG2 NR Ad hoc 1801,Vancouver, Canada, R2-1801054, R2-1712351, Jan. 22-26, 2018, (3p).

Intel Corporation (rapporteur), "Email discussion reporton [NR-AH1801#07][NR] Reply LS to CT1 on AC", 3GPP TSG RAN WG2 Meeting #101, Athens, Greece, R2-1802937, Feb. 26-Mar. 2, 2018, (34p).

3rd Generation Partnership Project;Technical Specification Group Radio Access Network;Evolved Universal Terrestrial Radio Access (E-UTRA);vRadio Resource Control (RRC); Protocol specification (Release 16), 3GPP TS 36.331, V16.2.1, Sep. 2020, (1081p).

State Intellectual Property Office of the People's Republic of China, Office Action and Search Report Issued in Application No. 201880000617.X, dated Nov. 3, 2021, 29 pages. (Submitted with Machine Translation).

Intellectual property India, Office Action Issued in Application No. 202047049174, dated Dec. 10, 2021, 7 pages.

Huawei et al., "WF on initial access with SUL for LTE-NR UL Coexistence", 3GPP TSG RAN WG1 meeting #90 R1-1714833, Prague, Czech Republic, Aug. 21-25, 2017, 3 pages.

State Intellectual Property Office of the People's Republic of China, Office Action and Search Report Issued in Application No. 201880000617.X dated Apr. 24, 2022, (Submitted with Machine/Partial Translation), (22p).

* cited by examiner

METHOD AND APPARATUS FOR CONTROLLING NETWORK ACCESS

CROSS REFERENCE TO RELATED APPLICATION

This application is a national phase application based on International Application No. PCT/CN2018/083786, filed Apr. 19, 2018, the content of which is incorporated herein by reference.

TECHNICAL FIELD

The present disclosure relates to the technical field of communications, and in particular to a method and an apparatus for controlling network access.

BACKGROUND

With the development of wireless communication technologies, mobile communication networks have gradually evolved to 5G, that is, NR (New Radio) network. 5G networks allow a large number of different types of user equipment to access the networks, and support a large variety of traffic types.

The 5G network inherits the AC (Access Control) barring mechanism of the 4G network LTE (Long Term Evolutions) system to control UE access to the network. The basic access process is: when user equipment needs to initiate a traffic request, one or more access identities and an access category are provided by NAS (Non Access Stratum) to AS (Access Stratum), and used for AC barring to decide whether the UE can initiate the traffic request. Through the AC barring decision process, it is possible to realize load control of uplink carrier, to avoid the occurrence of excessive load of the uplink carrier. If the uplink carrier is overloaded for a period of time, a traffic request initiated by the UE through the carrier in the period of time may not reach a base station due to the collision of access channel messages, resulting in failure of response to the traffic request and affecting the user experience of the 5G network.

SUMMARY

In order to overcome the problems in the related art, examples of the present disclosure provide a method and an apparatus for controlling network access, so as to improve the uplink coverage capability of the NR system and realize load control on the SUL carrier.

According to a first aspect of the examples of the present disclosure, a method for controlling network access is provided, and the method includes:

determining a target type carrier carrying traffic to be transmitted when a traffic request is to be initiated, wherein the target type carrier includes: a supplementary uplink (SUL) carrier, or a non-SUL carrier;

determining target access control (AC) configuration information applicable to the target type carrier according to AC configuration information issued by a base station; and determining whether the user equipment is allowed to perform an AC process through the target uplink carrier by matching the target AC configuration information against access detection information of the user equipment.

In an example, in response to that the user equipment is currently in any one of an inactive state, idle state, or out-of-synchronization state in a connected state, determining the target type carrier carrying traffic to be transmitted including:

determining the target type carrier according to a reference signal received power (RSRP); or, determining the target type carrier according to uplink carrier indication information issued by the base station, wherein the uplink carrier indication information is configured to inform the user equipment to initiate a random access request through a specified type of uplink carrier.

In an example, in response to that the user equipment is currently in a connected state, determining the target type carrier by at least one of the following:

determining the target type carrier according to latest historical scheduling information including uplink carrier grant information;

determining the target type carrier according to a reference signal received power (RSRP); or determining the target type carrier according to uplink carrier indication information issued by the base station, where the uplink carrier indication information is configured to inform the user equipment to initiate a traffic request through a specified type of uplink carrier.

In an example, determining the target type carrier according to the RSRP includes:

comparing a detected RSRP with a preset power threshold;

determining the SUL carrier as the target type carrier when the RSRP is less than the preset power threshold; and determining the non-SUL carrier as the target type carrier when the RSRP is greater than or equal to the preset power threshold.

In an example, determining the target type carrier according to the latest historical scheduling information includes:

obtaining an effective time duration of the historical scheduling information;

determining an interval duration between a current time and a receiving time of the historical scheduling information; and determining the target type carrier according to the uplink carrier grant information in the historical scheduling information in response to that the interval duration is shorter than the effective time duration.

In an example, determining the target AC configuration information applicable to the target type carrier includes:

obtaining first AC configuration information applicable to the non-SUL carrier when the target type carrier is the non-SUL carrier; and obtaining second AC configuration information applicable to the SUL carrier when the target type carrier is the SUL carrier.

In an example, determining the target AC configuration information applicable to the target type carrier according to the AC configuration information issued by the base station includes:

obtaining two independently-configured AC configuration lists from two different messages or a same message issued by the base station, wherein each of the AC configuration lists includes: a correspondence between preset uplink carrier information and AC configuration information; and determining the target AC configuration information applicable to the target type carrier by matching the two AC configuration lists against the target type carrier.

In an example, determining the target AC configuration information applicable to the target type carrier according to the AC configuration information issued by the base station includes:

obtaining public AC configuration information and carrier applicable information issued by the base station, wherein the carrier applicable information is configured to indicate an uplink carrier applicable condition of each piece of sub-configuration information in the public AC configuration information, and the carrier applicable information includes at least an applicable carrier type; and determining the target AC configuration information applicable to the target type carrier by matching the carrier applicable information of each piece of sub-configuration information against the target type carrier.

In an example, the carrier applicable information further includes: an effective time range indicating an allowable time range in which the sub-configuration information is applicable to a preset uplink carrier; and determining the target AC configuration information applicable to the target type carrier by matching the carrier applicable information of each piece of sub-configuration information against the target type carrier includes:

matching the applicable carrier type of each piece of sub-configuration information against the target type carrier;

determining whether a current time is within the effective time range when the target type carrier belongs to the applicable carrier type of one piece of sub-configuration information;

and determining that the sub-configuration information belongs to the target AC configuration information when the current time is within the effective time range.

According to a second aspect of the examples of the present disclosure, a method for controlling network access is provided, the method applicable to a base station, and including:

determining access control (AC) configuration information applicable to a supplementary uplink (SUL) carrier and a non-SUL carrier, wherein the AC configuration information includes first AC configuration information applicable to the non-SUL carrier, and second AC configuration information applicable to the SUL carrier; and sending the AC configuration information to user equipment, to enable the user equipment to determine target AC configuration information according to a target type carrier for carrying traffic to be transmitted and perform an AC process based on the target AC configuration information.

In an example, sending the AC configuration information to the user equipment includes:

generating two independently-configured AC configuration lists according to the first access control configuration information and the second access control configuration information, wherein each of the AC configuration lists includes: a correspondence between preset uplink carrier information and AC configuration information; and sending the two independently-configured AC configuration lists to the user equipment through two messages or one message.

In an example, sending the AC configuration information to the user equipment includes:

providing public AC configuration information and carrier applicable information according to the first AC configuration information and the second AC configuration information, wherein the carrier applicable information is configured to indicate an uplink carrier applicable condition of each piece of sub-configuration information in the public AC configuration information, and the carrier applicable information includes at least an applicable carrier type; and sending the public AC configuration information and the carrier applicable information to the user equipment, to enable the user equipment to respectively determine first AC configuration information applicable to the non-SUL carrier and second AC configuration information applicable to the SUL carrier based on the public AC configuration information and the carrier applicable information.

In an example, the carrier applicable information further includes: an effective time range indicating an allowable time range in which the sub-configuration information is applicable to a preset uplink carrier.

In an example, the method further includes:

sending uplink carrier indication information to the user equipment, wherein the uplink carrier indication information is configured to inform the user equipment to initiate a network access request through a specified type of uplink carrier, wherein the specified type of uplink carrier is a SUL carrier or a non-SUL carrier.

According to a third aspect of the examples of the present disclosure, an apparatus for controlling network access is provided. The apparatus is provided in a user equipment, and includes:

an uplink carrier determining module configured to determine a target type carrier carrying traffic to be transmitted when a traffic request is to be initiated, wherein the target type carrier includes: a supplementary uplink (SUL) carrier, or a non-SUL carrier;

a configuration information determining module configured to determine target access control (AC) configuration information applicable to the target type carrier according to AC configuration information issued by a base station; and an access control module configured to determine whether the user equipment is allowed to perform an AC process through the target uplink carrier by matching the target AC configuration information against access detection information of the user equipment.

In an example, in response to that the user equipment is currently in any one of an inactive state, idle state, or out-of-synchronization state in a connected state, the uplink carrier determining module includes:

a first determining submodule configured to determine the target type carrier according to a reference signal received power (RSRP); or a second determining submodule configured to determine the target type carrier according to uplink carrier indication information issued by the base station, wherein the uplink carrier indication information is configured to inform the user equipment to initiate a random access request through a specified type of uplink carrier.

In an example, in response to that the user equipment is currently in a connected state, the uplink carrier determining module includes any one of the following:

a first determining submodule configured to determine the target type carrier according to a reference signal received power (RSRP);

a second determining submodule configured to determine the target type carrier according to uplink carrier indication information issued by the base station, wherein the uplink carrier indication information is configured to inform the user equipment to initiate a traffic request through a specified type of uplink carrier; and a third determining submodule configured to determine the target type carrier according to latest historical scheduling information including uplink carrier grant information.

In an example, the first determining submodule includes:

a comparing unit configured to compare a detected RSRP with a preset power threshold;

a SUL carrier determining unit configured to determine the SUL carrier as the target type carrier when the RSRP is less than the preset power threshold; and a non-SUL carrier determining unit configured to determine the non-SUL carrier as the target type carrier when the RSRP is greater than or equal to the preset power threshold.

In an example, the third determining submodule includes:

a valid-time-information obtaining unit configured to obtain an effective time duration of the historical scheduling information;

an interval duration determining unit configured to determine an interval duration between a current time and a receiving time of the historical scheduling information; and a carrier determining unit configured to, in response to that the interval duration is shorter than the effective time duration, determine the target type carrier according to the uplink carrier grant information in the historical scheduling information.

In an example, the configuration information determining module includes:

a first configuration information determining submodule configured to obtain first AC configuration information applicable to the non-SUL carrier when the target type carrier is the non-SUL carrier; and a second configuration information determining submodule configured to obtain second AC configuration information applicable to the SUL carrier when the target type carrier is the SUL carrier.

In an example, the configuration information determining module includes:

a first information obtaining submodule configured to obtain two independently-configured AC configuration lists from two different messages or a same message issued by the base station, wherein each of the AC configuration lists includes: a correspondence between preset uplink carrier information and AC configuration information; and a first matching submodule configured to determine the target AC configuration information applicable to the target type carrier by matching the two AC configuration lists against the target type carrier.

In an example, the configuration information determining module includes:

a second information obtaining submodule configured to obtain public AC configuration information and carrier applicable information issued by the base station, wherein the carrier applicable information is configured to indicate an uplink carrier applicable condition of each piece of sub-configuration information in the public AC configuration information, and the carrier applicable information includes at least an applicable carrier type; and a second matching submodule configured to determine the target AC configuration information applicable to the target type carrier by matching the carrier applicable information of each piece of sub-configuration information against the target type carrier.

In an example, the carrier applicable information further includes: an effective time range indicating an allowable time range in which the sub-configuration information is applicable to a preset uplink carrier; and the second matching submodule includes:

a carrier type matching unit configured to match the applicable carrier type of each piece of sub-configuration information against the target type carrier;

a valid-time determining unit configured to determine whether a current time is within the effective time range when the target type carrier belongs to the applicable carrier type of one piece of sub-configuration information; and a target information determining unit configured to determine that the sub-configuration information belongs to the target AC configuration information when the current time is within the effective time range.

According to a fourth aspect of the examples of the present disclosure, an apparatus for controlling network access is provided. The apparatus is provided in a base station, and includes:

an information configuration module configured to determine an access control (AC) configuration information applicable to a supplementary uplink (SUL) carrier and a non-SUL carrier, wherein the AC configuration information includes first AC configuration information applicable to the non-SUL carrier, and second AC configuration information applicable to the SUL carrier; and a sending module configured to send the AC configuration information to user equipment, to enable the user equipment to determine target AC configuration information according to a target type carrier for carrying traffic to be transmitted and perform an AC process based on the target AC configuration information.

In an example, the sending module includes:

a configuration-list generation submodule configured to generate two independently-configured AC configuration lists according to the first access control configuration information and the second access control configuration information, wherein each of the AC configuration lists includes: a correspondence between preset uplink carrier information and AC configuration information; and a first sending submodule configured to send the two independently-configured AC configuration lists to the user equipment through two messages or one message.

In an example, the sending module includes:

an information setting submodule configured to provide public AC configuration information and carrier applicable information according to the first AC configuration information and the second AC configuration information, wherein the carrier applicable information is configured to indicate an uplink carrier applicable condition of each piece of sub-configuration information in the public AC configuration information, and the carrier applicable information includes at least an applicable carrier type; and a second sending submodule configured to send the public AC configuration information and the carrier applicable information to the user equipment to enable the user equipment to respectively determine first AC configuration information applicable to the non-SUL carrier and second AC configuration information applicable to the SUL carrier based on the public AC configuration information and the carrier applicable information.

In an example, the carrier applicable information further includes: an effective time range indicating an allowable time range in which the sub-configuration information is applicable to a preset uplink carrier.

In an example, the apparatus further includes:

an indication information sending module configured to send uplink carrier indication information to the user equipment, wherein the uplink carrier indication information is configured to inform the user equipment to initiate a network access request through a specified type of uplink carrier, and the specified type of uplink carrier is a SUL carrier or a non-SUL carrier.

According to a fifth aspect of the examples of the present disclosure, a non-transitory computer-readable storage medium having computer instructions stored thereon is provided, wherein, when the instructions are executed by a processor, the steps of the method in the first aspect.

According to a sixth aspect of the examples of the present disclosure, a non-transitory computer-readable storage medium having computer instructions stored thereon is provided, wherein, when the instructions are executed by a processor, the steps of the method in the second aspect are performed.

According to a seventh aspect of the examples of the present disclosure, an apparatus for controlling network access is provided, including:

a processor; and a memory for storing processor executable instructions;

wherein the processor is configured to:

determine a target type carrier carrying traffic to be transmitted when a traffic request is to be initiated, wherein the target type carrier includes: a supplementary uplink (SUL) carrier, or a non-SUL carrier;

determine target access control (AC) configuration information applicable to the target type carrier according to AC configuration information issued by a base station; and determine whether the user equipment is allowed to perform an AC process through the target uplink carrier by matching the target AC configuration information against access detection information of the user equipment.

According to an eighth aspect of the examples of the present disclosure, an apparatus for controlling network access is provided, including:

a processor; and a memory for storing processor executable instructions;

wherein the processor is configured to:

determine access control (AC) configuration information applicable to a supplementary uplink (SUL) carrier and a non-SUL carrier, wherein the AC configuration information includes first AC configuration information applicable to the non-SUL carrier, and second AC configuration information applicable to the SUL carrier; and send the AC configuration information to user equipment, to enable the user equipment to determine target AC configuration information according to a target type carrier for carrying traffic to be transmitted and perform an AC process based on the target AC configuration information.

The technical solutions provided by the examples of the present disclosure can include the following beneficial effects.

With the method for controlling network access provided by the examples of the present disclosure, the UE can use two uplink carriers, namely, the non-SUL carrier and the SUL carrier to initiate a network access request to the base station to improve the uplink coverage performance of the 5G NR system. On this basis, regardless of whether the UE selects the non-SUL carrier or the SUL carrier, the corresponding AC configuration information issued by the base station can be used to perform the AC process, and the load control of the two uplink carriers can be performed flexibly and effectively to prevent the UE from blindly initiating a traffic request through the currently selected target uplink carrier, causing the target uplink carrier load on the network side to be too high, and causing channel congestion. It can ensure the reliability of information transmission on each uplink carrier, improve data transmission efficiency, and improve the user experience of the 5G NR system.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
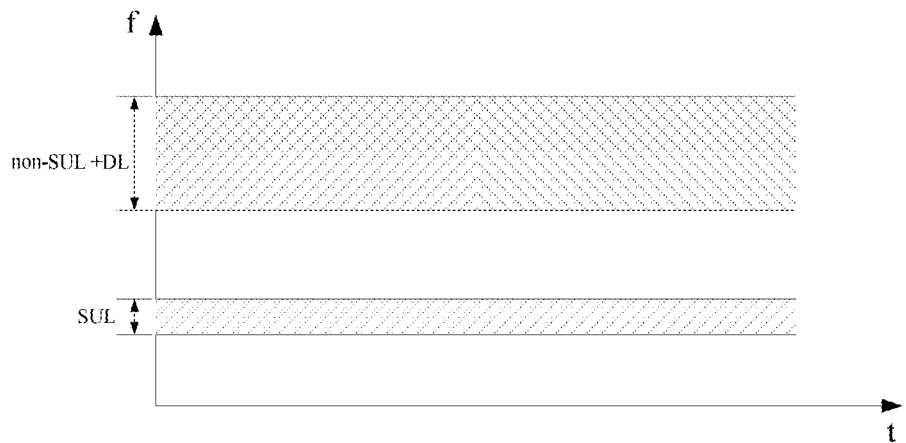
FIG. 1 is a schematic diagram illustrating distribution of cell carriers according to an example of the present disclosure.

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining". The "network" and "system" appearing in the embodiments of the present disclosure express the same concept, and the communication system is the communication network.

The technical solution provided in the present disclosure is applicable to a 5G NR system. The entities for performing methods involved in the present disclosure may include a base station and user equipment (UE), where the base station can be a base station or a sub-base station provided with a large-scale antenna array. The user equipment can be a user terminal, a user node, a mobile terminal or a tablet computer, etc. In a specific implementation, the base station and the user equipment are independent and are also related to each other to cooperate to implement the technical solutions provided in the present disclosure.

In the application scenario of the disclosed solution, a SUL (Supplementary Uplink) feature is introduced in a 5G NR system, that is, one downlink carrier and two uplink carriers are configured in the same cell to improve uplink covering ability of the system. The above two uplink carriers include a SUL carrier (or secondary uplink carrier) and a non-SUL carrier (or primary uplink carrier). The frequency band to which the SUL carrier belongs is lower than the frequency band to which the non-SUL carrier belongs. For example, the SUL carrier of the NR system can be in the same frequency band as the uplink carrier of the LTE system. Referring to the diagram of distribution of cell carriers shown in FIG. 1, in the NR system, the non-SUL carrier allocated by the base station for a cell is in the same frequency range as the downlink DL carrier, and is located in a higher frequency band. The SUL carrier does not belong to the same frequency range as the DL (Downlink) carrier, and is located in a lower frequency band.

At the same time, the UE can select SUL carrier or non-SUL carrier for PUSCH (Physical Uplink Shared Channel) data transmission.

Figure 2:
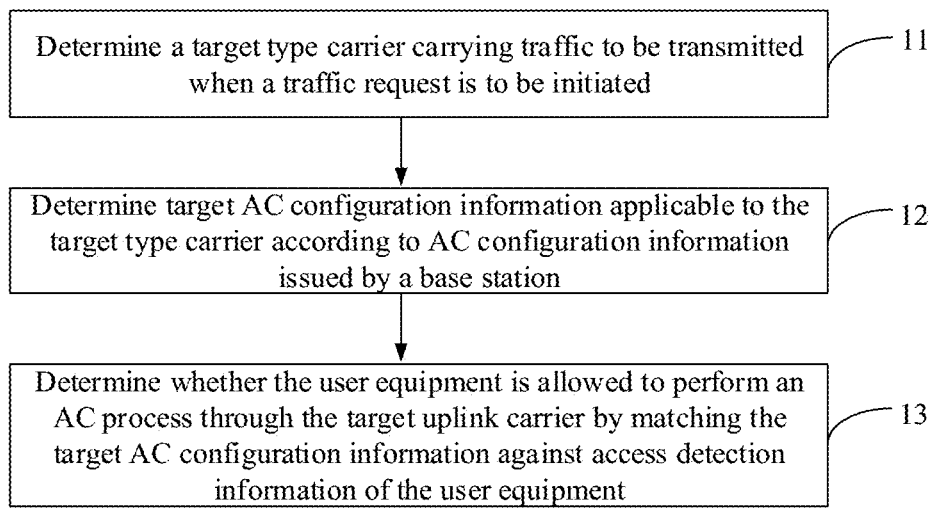
FIG. 2 is a flowchart illustrating a method for controlling network access according to an example of the present disclosure.

In view of above, the present disclosure provides a method for controlling network access. Referring to the flowchart illustrating a method for controlling network access according to an example shown in FIG. 2, which is applicable to a UE, the method can include the following steps.

At step 11, when a traffic request is to be initiated, a target type carrier carrying the traffic to be transmitted is determined, where the target type carrier includes a SUL carrier or a non-SUL carrier.

In the present disclosure, when a UE in a cell needs to initiate a traffic request to the network, it can first determine an available uplink carrier, that is, the target type carrier, based on the current state information of the UE. It should be noted here that the target type carrier involved in the present disclosure refers to an uplink carrier, that is, a carrier that carries uplink information, and the uplink information refers to information sent by the UE to the base station.

The state information of the UE can include: an inactive state, an idle state, and a connected state. The connected state of the UE can also include two sub-states: a synchronized state and an out-of-synchronization state. The inactive state and the idle state indicate that the UE is not currently connected to the network. The synchronized state in the connected state indicates that the UE is currently connected to the network and is uplink synchronized, is configured with PUCCH resources, and can be normally scheduled. The out-of-synchronization state in the connected state indicates that the UE is currently accessing the network but is out-of-synchronization in the uplink, has no PUCCH resources, and cannot be normally scheduled.

In the present disclosure, the UE can determine the target type carrier in at least one of the following implementations.

In the first implementation, the target type carrier may be determined according to RSRP (Reference Signal Receiving Power).

Figure 3:
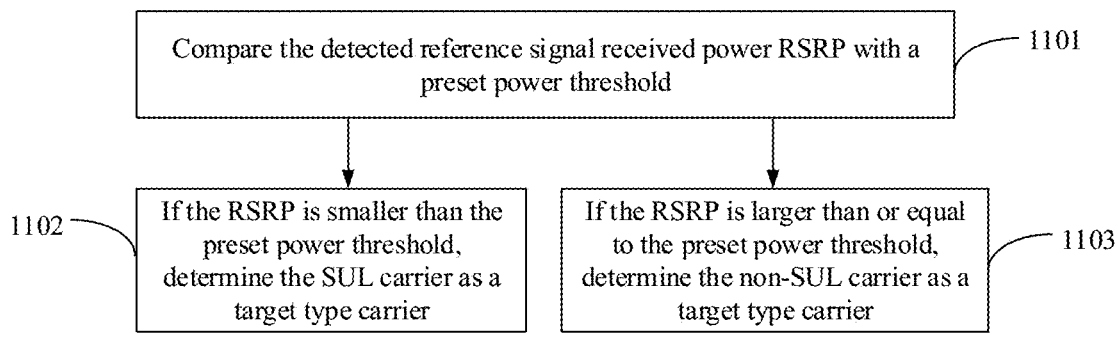
FIG. 3 is a flowchart illustrating another method for controlling network access according to an example of the present disclosure.

Referring to the flowchart illustrating another method for controlling network access according to an example shown in FIG. 3, the above step 11 can include step 1101-step 1103.

At step 1101, the detected reference signal received power RSRP is compared with a preset power threshold.

In the present disclosure, the UE can detect the RSRP value in real time or in a preset detection period, and compare it with a preset power threshold. If the RSRP value is greater than or equal to the preset power threshold, the non-SUL carrier is determined as the target type carrier. That is, it is determined that the UE can initiate an RA request or traffic request to the base station through a non-SUL carrier. Otherwise, the following step 1102 is performed.

At step 1102, if the RSRP is less than the preset power threshold, the SUL carrier is determined as a target type carrier.

That is, if the RSRP detected by the UE is less than the preset power threshold, for example, the UE is currently at the edge of a cell, the UE can determine to initiate an RA request or a traffic request to the base station through the SUL carrier.

At step 1103, if the RSRP is greater than or equal to the preset power threshold, the non-SUL carrier is determined as a target type carrier.

The first implementation is applicable to select the target type carrier for a UE in an inactive state, a UE in an idle state, and a UE in a connected state and an uplink out-of-synchronization state.

In the second implementation, the target type carrier may be determined according to the uplink carrier indication information issued by the base station In examples of the present disclosure, the base station may send uplink carrier indication information to the UE. The uplink carrier indication information is used to inform the UE to use a specified type of uplink carrier to initiate a traffic request.

This second implementation is applicable for UEs in various states to perform step 11 above.

For a UE in a connected state, a second implementation can be used to determine a target type carrier in an application scenario such as requesting uplink synchronization, cell handover, and adding a secondary base station SeNB. The base station can issue the uplink carrier indication information to the UE in a connected state through a preset signaling. For a UE in an idle state and a UE in an inactive state, the base station can send the uplink carrier indication information to the UE in the cell through a system message such as SIB2.

In the third implementation, the target type carrier may be determined based on historical scheduling information.

In examples of the present disclosure, for a UE in a synchronized state in a connected state, the target type carrier may also be determined based on historical scheduling information, which can include the following two situations.

First situation, the target type carrier is directly determined according to the latest historical scheduling information.

For a UE in a connected state, the latest historical scheduling information issued by the base station to the UE includes: uplink carrier grant information, used to inform the UE of information such as a frequency range of the uplink carrier for historical scheduling. In an example of the present disclosure, the UE can continue to use the uplink carrier indicated by the latest historical scheduling information according to a preset policy to initiate subsequent traffic requests.

Second situation, the UE can also determine the target type carrier based on historical scheduling information and a preset effective time duration.

Figure 4:
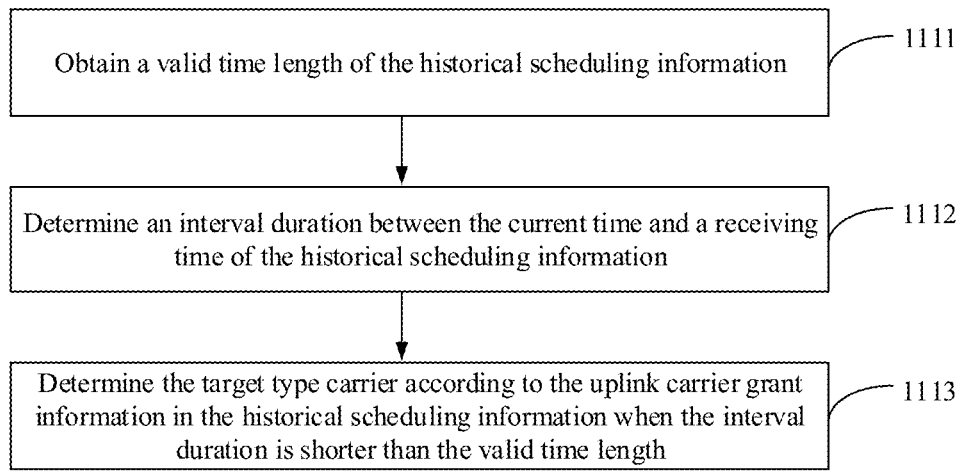
FIG. 4 is a flowchart illustrating another method for controlling network access according to an example of the present disclosure.

Referring to the flowchart illustrating another method for controlling network access according to an example shown in FIG. 4, the step 11 can include step 1111-step 1113.

At step 1111, an effective time duration of the historical scheduling information is obtained. The effective time duration may also be referred as the valid time length.

In the present disclosure, the base station can notify the UE of an effective time duration of scheduling information, such as 30 minutes while sending the scheduling information to the UE at a historical time instant. Alternatively, after the time instant, the UE is notified of the effective time duration of the scheduling information through a separate signaling.

At step 1112, an interval duration between the current time and a receiving time of the historical scheduling information is determined.

Assuming that the current time is T2 and the time when the UE received the latest scheduling information is T1, the interval $\Delta T$ between the two times can be calculated, $\Delta T = T2 - T1$.

At step 1113, if the interval duration is shorter than the effective time duration, the target type carrier is determined according to the uplink carrier grant information in the historical scheduling information.

The interval duration $\Delta T$ is compared with the effective time duration of the historical scheduling information, and it is still assumed that the effective time duration of the historical scheduling information is 30 minutes. If $\Delta T$ is shorter than 30 minutes, the UE can determine the target type carrier base on the uplink carrier grant information in the historical scheduling information. For example, if the uplink carrier granted in the most recent historical scheduling information belongs to a non-SUL carrier, the target type carrier is currently determined to be a non-SUL carrier; if the uplink carrier granted in the most recent historical scheduling information belongs to a SUL carrier, then the target type carrier is currently determined to be a SUL carrier.

On the contrary, if AT is greater than or equal to 30 minutes, it is considered that the UE has not received the scheduling grant for a long time. During this time period, the channel conditions can have changed significantly, and the uplink grant information in the historical scheduling information may become useless. At this time, the UE can determine the target carrier type according to a first implementation described above, so as to ensure the accuracy of the selection for the target uplink carrier.

At step 12, target AC configuration information applicable to the target type carrier is determined according to the access control AC configuration information issued by the base station.

Similar to the LTE system, when the UE initiates a traffic request, it needs to determine whether the UE is currently allowed to access the network based on the AC (Access Control) configuration information issued by the base station. That is, the AC process is performed. The AC configuration information is used to inform the UE under which conditions it will be restricted from accessing the network, or under which conditions it will be allowed to access the network.

In the present disclosure, the base station needs to inform the UE of two types of AC configuration information including: the first AC configuration information applicable to a non-SUL carrier and the second AC configuration information applicable to a SUL carrier. Thus, after the current UE determines the target type carrier according to step 11, the UE further determines the target AC configuration information applicable to itself, so as to perform the AC process according to the target AC configuration information.

In the present disclosure, corresponding to different ways in which the base station issues AC configuration information to the UE, the current UE can use at least one of the following implementations to determine the target AC configuration information applicable to itself. Taking the current UE1 selecting a SUL carrier as an example, the implementations will be described below.

In first implementation, the base station issues independent sets of AC configuration information for non-SUL carriers and SUL carriers. In other words, the UE can receive two sets of AC configuration information sent by the base station.

The UE can store the above two sets of AC configuration information in the form of a list, as shown in Table 1:

TABLE 1

| Uplink Carrier Type | AC Configuration Information |
|---|---|
| Non-SUL Carrier | First AC Configuration Information |
| SUL Carrier | Second AC Configuration Information |

Each set of AC configuration information can include: a correspondence between access detection parameters and AC barring configuration information.

The access detection parameter is a parameter that is to be detected when determining whether the UE can access a cell network according to a preset access control mechanism, such as PLMN (Public Land Mobile Network) identification, Access Category, Access Identity of a UE and other parameters.

The access barring configuration information can be a limit value set based on one or more of the above access detection parameters, and the limit value can be a specific value, a range of values, etc., which is not limited in the present disclosure.

In this case, UE1 can match the table 1 according to the target type carrier, for example, the SUL carrier, and determine the second AC configuration information as the target AC configuration information.

In second implementation, the base station issues a set of public AC configuration information to the UE while issuing carrier applicable information.

Figure 5:
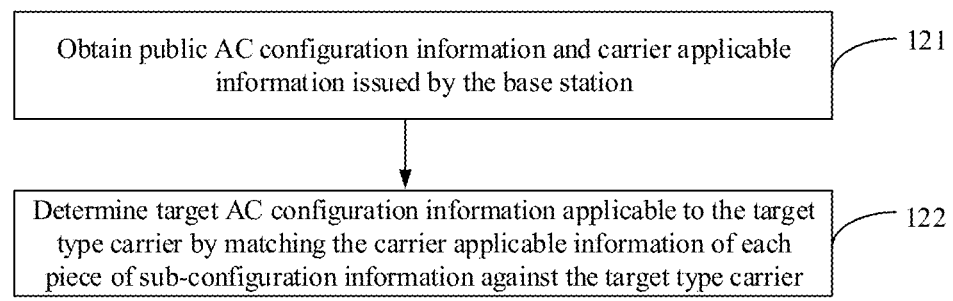
FIG. 5 is a flowchart illustrating another method for controlling network access according to an example of the present disclosure.

Referring to the flowchart illustrating another method for controlling network access according to an example shown in FIG. 5, the step 12 can include step 121-step 122.

At step 121, public AC configuration information and carrier applicable information issued by the base station are obtained.

In the present disclosure, the UE can obtain a set of public AC configuration parameters from the system message issued by the base station, and receive carrier applicable information issued by the base station. The carrier applicable information is used to indicate an uplink carrier applicable condition of each piece of sub-configuration information included in the public AC configuration information.

At step 122, target AC configuration information applicable to the target type carrier is determined by matching the carrier applicable information of each piece of sub-configuration information against the target type carrier.

In an example of the present disclosure, the carrier applicable information issued by the base station can be empty. In this case, the UE can determine that the above public AC configuration information is applicable to both SUL carriers and non-SUL carriers according to a preset rule. Alternatively, the above public AC configuration information is only applicable to non-SUL carriers.

In another example of the present disclosure, the carrier applicable information issued by the base station is not empty. Depending on the content contained therein, the implementation of the above step 122 can include the following two cases.

In the first case, the carrier applicable information includes applicable carrier types. The applicable carrier types are used to explicitly indicate the uplink carrier types to which the pieces of sub-configuration information included in the public AC configuration information respectively apply. In this case, the UE can determine target AC configuration information by matching the carrier type information respectively applicable to the each piece of sub-configuration information against the target type carrier selected by the UE.

As an example, assuming that the public AC configuration information mentioned above is divided into N parts according to a preset rule. That is, the public AC configuration information includes a total of N pieces of sub-configuration information, respectively represented as: configuration information 1, configuration information 2, configuration information 3, . . . , configuration information N. The base station can indicate which type of uplink carrier each piece of sub-configuration information is applicable to with the carrier applicable information. As an example, the UE can use the following Table 2 to record the information issued by the base station:

TABLE 2

| Public AC Configuration Information | Applicable Carrier Type |
|---|---|
| Configuration Information 1 | Non-SUL Carrier |
| Configuration Information 2 | SUL Carrier |
| Configuration Information 3 | Both Applicable |
| . . . | . . . |
| Configuration Information N | SUL Carrier |

Table 2 records the correspondence between pieces of sub-configuration information and the applicable carrier types. One piece of sub-configuration information can be applicable to one type of uplink carrier, and can also be applicable to both two types of uplink carriers, such as the configuration information 3 above.

The process for UE1 to determine the target AC configuration information is as follows. According to the target type carrier, for example, the SUL carrier, items in Table 2 are matched with the SUL carrier to determine the target AC configuration information, including: configuration information 2, configuration information 3 . . . configuration information N.

In the second case, in addition to the applicable carrier type, the carrier applicable information also includes an effective time range. The effective time range indicates an allowable time range in which a piece of sub-configuration information is applicable to the preset uplink carrier. The effective time range may also be referred as the valid time range.

Figure 6:
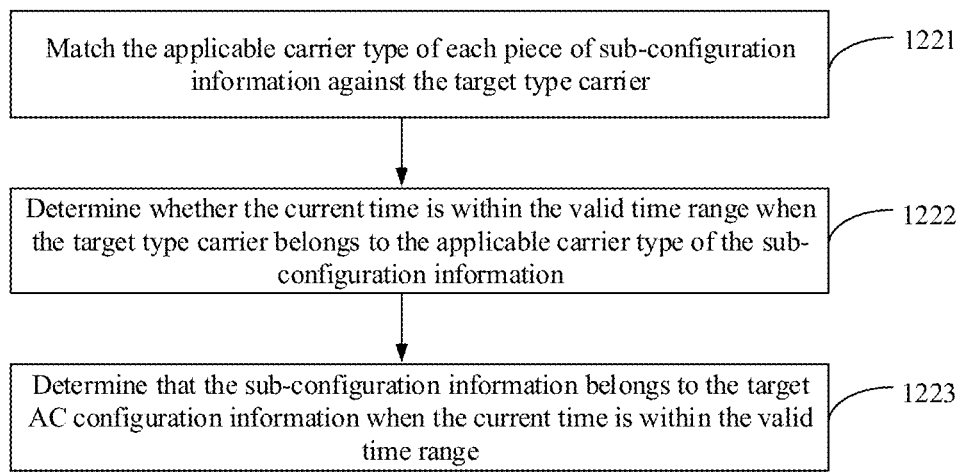
FIG. 6 is a flowchart illustrating another method for controlling network access according to an example of the present disclosure.

Referring to the flowchart illustrating another method for controlling network access according to an example shown in FIG. 6, the step 122 can include step 1221-step 1223.

At step 1221, the applicable carrier type of each piece of sub-configuration information is matched against the target type carrier.

At step 1222, if the target type carrier belongs to the applicable carrier type of the sub-configuration information, whether the current time is within the effective time range is determined.

At step 1223, if the current time is within the effective time range, it is determined that the sub-configuration information belongs to the target AC configuration information.

As an example, still taking the above N pieces of sub-configuration information as an example, the UE can use a preset list to record the correspondence between the pieces of sub-configuration information in the public AC configuration information, and the applicable carrier types and the effective time ranges, as shown in Table 3:

TABLE 3

| Public AC Configuration Information | Applicable Carrier Type | Effective time Range |
|---|---|---|
| Configuration Information 1 | Non-SUL Carrier | None |
| Configuration Information 2 | SUL Carrier | First Time Range |

TABLE 3-continued

| Public AC Configuration Information | Applicable Carrier Type | Effective time Range |
|---|---|---|
| Configuration Information 3 | Both Applicable | None |
| ... | ... | ... |
| Configuration Information N | SUL Carrier | Second Time Range |

In Table 3 above, the value of the "effective time range" field being None means that there is no limit for the effective time.

The process for UE1 to determine the target AC configuration information is as follows. According to the target type carrier, for example, the SUL carrier, items in Table 3 are matched with the SUL carrier to determine the target AC configuration information, including: configuration information 2, configuration information 3 . . . configuration information N. After that, for the sub-configuration information that is set with the effective time range, such as the configuration information 2, the configuration information N, etc., the determination for the time validity is continued.

Taking the configuration information 2 in Table 3 as an example, for the configuration information 2 with an effective time range, the UE1 continues to determine whether the current time is within the first time range; if so, it is determined that the configuration information 2 belongs to the target AC configuration information. On the contrary, if the current time is outside the first time range, it is determined that the configuration information 2 does not belong to the target AC configuration information of the UE1. In the same way, determination for other pieces of sub-configuration information that is applicable to the SUL carrier and set with an effective time range is performed through the above process, and all pieces of sub-configuration information that meets the carrier applicable conditions are determined as the target AC configuration information of UE1.

At step 13, the target AC configuration information is matched against the access detection information of the user equipment, to determine whether the user equipment is allowed to perform the AC process through the target type carrier.

After the target AC configuration information is determined according to the target type carrier, AC barring decision can be performed by matching the access detection information of the UE against the target AC configuration information. The access detection information of the UE is the information that needs to be detected when determining whether the UE can access the cell network through the target type carrier according to the preset access control mechanism. The access detection information can include: PLMN id, Access Category, Access identity, traffic type and other parameter value.

In the present disclosure, the process for the UE to perform AC barring decision is similar to the related technology. The target AC configuration information includes: AC barring configuration information corresponding to an access detection parameter.

The AC barring configuration information can be a limit value set for one or more of the aforementioned access detection parameters. The following describes with specific examples.

In a first example, if the AC barring configuration information of configuration information 2 is: (PLMN ID, 6), it means that a UE which has a PLMN ID of 6 is restricted from initiating a random access request through a SUL carrier. Then, the process for UE1 to perform AC barring decision is: when UE1 determines to access the network through a SUL carrier, it first matches the above-mentioned target AC configuration information, namely configuration information 2, against its own PLMN ID. If the PLMN ID of UE1 is 6, UE1 is restricted from accessing to the network. On the contrary, if the PLMN ID of UE1 is not 6, it is determined that UE1 can initiate a network access request through the SUL carrier, that is, an RA request or a traffic request.

In a second example, the AC configuration information can include: AC barring configuration information corresponding to various access detection parameters, for example, as shown in Table 4:

TABLE 4

| PLMN ID | Access categories | Access identities |
|---|---|---|
| 6 | 0~5 | 1, 3, 10 |

UE1 performs the AC barring decision process as follows. First, the target AC configuration information is matched against its own PLMN ID. If the PLMN ID of UE1 is 6, it can be further determined whether its access category is in the range of 0-5. If so, it can be further determined whether its access identity is any one of 1, 3, and 10. If so, it can be determined that UE1 is prohibited from accessing the network through the SUL carrier. On the contrary, if the access detection information of UE1 cannot satisfy all the above three restricted access conditions, it is determined that UE1 can access the network through the SUL carrier.

In a third example, in the present disclosure, the situation where the UE is restricted from accessing the network through the target type carrier can include two types: allowed access and restricted access with delay.

For example, on the basis of the second example above, if the access detection information of UE1 satisfies the three access restriction conditions in Table 4, it is necessary to further determine whether the access restriction configuration parameters include: a barring factor and barring time. If the access restriction configuration parameter does not include the restriction factor, it is determined that the user equipment is allowed to access the network through the SUL carrier. If the access restriction configuration parameter includes the restriction factor, a random number "rand" is randomly generated, "rand" is compared with the restriction factor; if the random number "rand" is less than the restriction factor, it is determined that UE1 is allowed to access the network through the SUL carrier; if the random number "rand" is greater than or equal to the restriction factor, it is determined that the user equipment is allowed to access the network after a delay according to the barring time.

The following is a detailed description in conjunction with specific examples. In addition to the AC barring parameter value, the sub-configuration information applicable to the SUL carrier also includes, according to related access control mechanisms, a barring factor and corresponding barring time, for example, as shown in Table 5:

TABLE 5

| PLMN ID | Access categories | Access identities | barring factor | barring time |
|---|---|---|---|---|
| 6 | 0~5 | 1, 3, 10 | 0.6 | 5 s |

Still taking UE1 as an example, by matching the AC barring configuration information corresponding to the PLMN ID, access category, and access identifier recorded in Table 5, it indicates that UE1 may be restricted from accessing the network through the SUL carrier. In addition, Table 5 also includes a barring factor. If the value of this field is 0, it means that UE1 is permanently restricted from accessing the network through the SUL carrier. If the value of the barring factor field is not 0, for example, it is 0.6 in Table 5, UE1 will randomly generate a random number "rand" between [0, 1) and compare it with the restriction factor 0.6. If the random number is less than 0.6, it is determined that UE1 is allowed to access the network through the SUL carrier; on the contrary, if the random number is greater than or equal to 0.6, it is determined that UE1 is restricted to access with a delay, and a timer is started at the same time. The value of the timer is $t=(A+B*rand)*5$ s, where A and B are constants agreed or broadcast by the system. After the timing ends, UE1 can initiate a random access request or traffic request through the SUL carrier.

It should be noted that after the UE has determined the target AC configuration information applicable to the target type carrier, how to perform the AC process is not limited to the above example, and can refer to the access control mechanism in the related technology, which will not be elaborated herein.

It can be seen that using the method for controlling network access provided by the examples of the present disclosure, the UE can use two types of uplink carriers, namely the non-SUL carrier and the SUL carrier, to initiate a random access request or a traffic request to the network to improve the uplink coverage performance of the 5G NR system, and improve the user experience of the 5G NR system. On this basis, when the UE determines to access the network through the SUL carrier, the UE can also perform the AC process based on the second AC configuration information that is applicable to the SUL carrier issued by the base station, to prevent the UE from blindly initiating an RA request or a traffic request to the base station through the SUL carrier and causing congestion in the channel of the SUL carrier. In addition, after the UE selects the non-SUL carrier, if the UE is currently in a non-idle state, such as inactive state, connected state, etc., according to the preset first AC configuration information, the AC process can also be performed to prevent the UE from initiating a traffic request through the non-SUL carrier when the non-SUL carrier channel load of the network is too high, thus improving the accuracy of load control on the uplink carrier and ensuring the reliability of information transmission on the non-SUL carrier.

Correspondingly, the present disclosure also provides a method for controlling network access on the base station side. Referring to a flowchart illustrating a method for controlling network access according to an example shown in FIG. 7, the method can include the following steps.

At step 21, access control AC configuration information respectively applicable to a SUL carrier and a non-SUL carrier are determined.

Similar to the base station determining an access control strategy for the non-SUL carrier in the related art, in the present disclosure, the base station can determine the AC configuration information applicable to the SUL carrier according to information such as the load condition of the SUL carrier of a cell. In the present disclosure, the AC configuration information applicable to the non-SUL carrier can be referred to as the first AC configuration information, and the configuration information applicable to the SUL carrier can be referred to as the second AC configuration information.

At step 22, the AC configuration information is sent to the user equipment, so that the user equipment determines the target AC configuration information according to the target type carrier for carrying the traffic to be transmitted and performs an access control AC process based on the target AC configuration information.

In the present disclosure, the base station can use the following at least two implementations to set AC configuration information for the two types of uplink carriers.

In a first implementation, the base station provides a set of AC configuration information respectively for each type of uplink carrier, and sends them to the UE respectively through system messages.

In an example, the base station generates two independently configured AC configuration lists according to the first AC configuration information and the second AC configuration information and the applicable uplink carriers. The two independently configured AC configuration lists include the first AC configuration list and the second AC configuration list. Each AC configuration list includes a correspondence between a preset uplink carrier and the AC configuration information.

The base station can send the first AC configuration list and the second AC configuration list to the UE respectively through two messages. Alternatively, the base station sends the two AC configuration lists to the UE simultaneously through a message. The UE receives the two AC configuration lists configured independently of each other.

During the process that the UE determines the target AC configuration information, after the UE determines the target type carrier, the UE can match the two AC configuration lists with the target type carrier to quickly determine the target AC configuration information applicable to the target type carrier, thereby improving the efficiency of performing the AC process.

In a second implementation, the base station provides a set of public AC configuration information for the two types of uplink carriers according to the first AC configuration information and the second AC configuration information and determines applicable ranges for the carriers, that is, determines the carrier applicable information of each piece of the sub-configuration information in the public AC configuration information. The carrier applicable information is used to indicate an uplink carrier applicable condition of each piece of sub-configuration information in the public AC configuration information, and the carrier applicable information includes at least an applicable carrier type. In another example of the present disclosure, the above carrier applicable information can further include: an effective time range indicating an allowable time range in which the sub-configuration information is applicable to a preset uplink carrier.

Correspondingly, the base station can send the public AC configuration information and carrier applicable information to the UE at the same time through one message, thus saving system signaling overhead.

Figure 7:
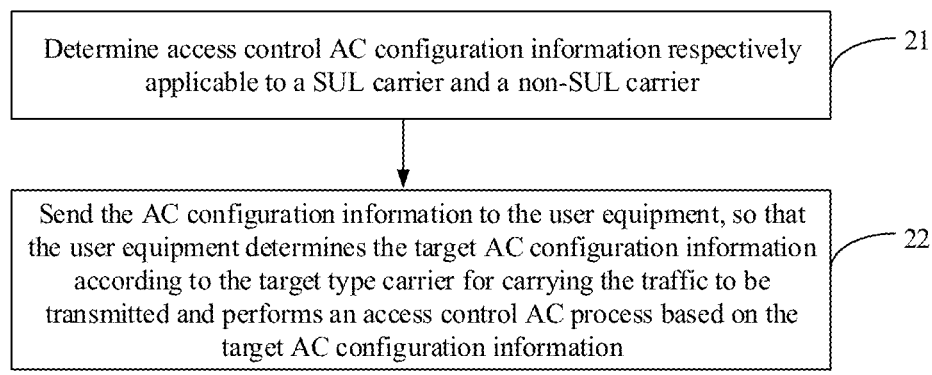
FIG. 7 is a flowchart illustrating a method for controlling network access according to an example of the present disclosure.
Figure 8:
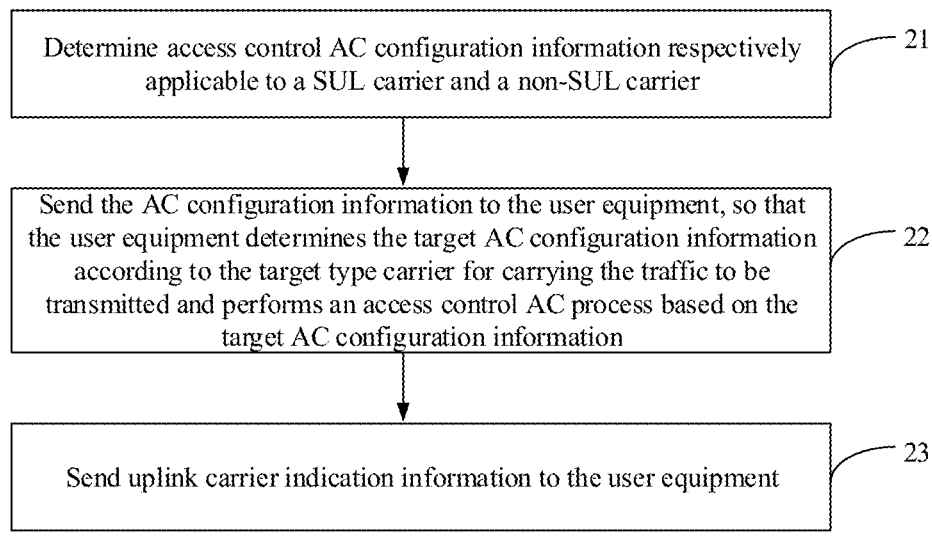
FIG. 8 is a flowchart illustrating another method for controlling network access according to an example of the present disclosure.

Referring to a flowchart of another method for controlling network access according to an example shown in FIG. 8, the method can further include step 23 based on the example shown in FIG. 7.

At step 23, uplink carrier indication information is sent to the user equipment, where the uplink carrier indication information is used to inform the user equipment to use a specified type of uplink carrier to initiate a network access request, and the specified type of uplink carrier is a SUL carrier or a non-SUL carrier.

Corresponding to the second implementation of step 11 above, the UE may determine the target type carrier according to the uplink carrier indication information issued by the base station, which will not be elaborated herein. The network access request includes: a random access request initiated by a UE in an idle state or an UE in an inactive state; and a traffic request initiated by a UE in a connected state.

Accordingly, by using the method for controlling network access provided by the present disclosure, the base station can set AC configuration information for different types of uplink carriers allocated to the cell, so as to realize flexible and effective load control for different carriers, avoid channel congestion of each uplink carrier due to excessive load, ensure the reliability of data transmission, improve data transmission efficiency, and improve the user experience of the 5G NR system.

For the sake of simplicity, the above method examples are all described as a series of action combinations, but those skilled in the art should appreciate that the present disclosure is not limited by the described order of the actions, and in the present disclosure, some steps can be performed in other order or simultaneously.

In addition, those skilled in the art should also appreciate that the examples described in the specification are optional, and the actions and modules involved are not necessarily required by the present disclosure.

Corresponding to the above method examples implementing application functions, the present disclosure also provides examples of apparatuses and corresponding terminals for implementing application functions.

Correspondingly, the present disclosure provides an apparatus for controlling network access, which can be provided in user equipment. Referring to a block diagram of an apparatus for controlling network access according to an example shown in FIG. 9, and the apparatus can include:

an uplink carrier determining module 31 configured to determine a target type carrier carrying traffic to be transmitted when a traffic request is to be initiated, where the target type carrier includes: a supplementary uplink (SUL) carrier, or a non-SUL carrier;

a configuration information determining module 32 configured to determine target AC configuration information applicable to the target type carrier according to AC configuration information issued by the base station;

an access control module 33 configured to determine whether the user equipment is allowed to perform an AC process through the target uplink carrier by matching the target AC configuration information against access detection information of the user equipment.

Figure 9:
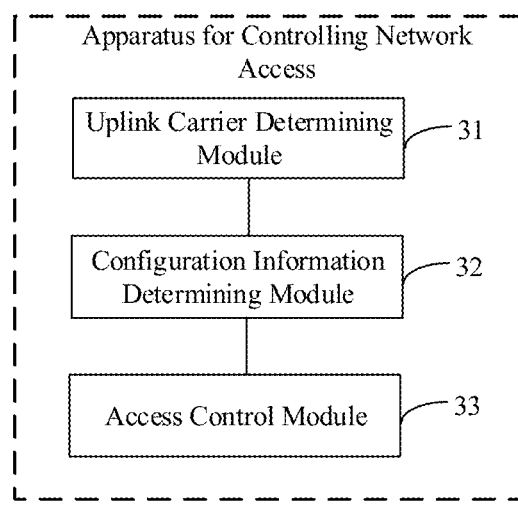
FIG. 9 is a block diagram illustrating an apparatus for controlling network access according to an example of the present disclosure.
Figure 10:
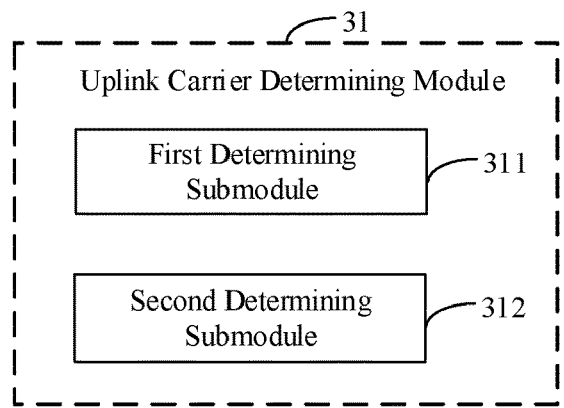
FIG. 10 is a block diagram illustrating another apparatus for controlling network access according to an example of the present disclosure.

Referring to the block diagram of another apparatus for controlling network access according to an example shown in FIG. 10, on the basis of the apparatus example shown in FIG. 9, if the user equipment is currently in any of the following states: an inactive state, an idle state, and out-of-synchronization state in a connected state, the uplink carrier determining module 31 can include:

a first determining submodule 311 configured to determine the target type carrier according to a reference signal received power (RSRP); or, a second determining submodule 312 configured to determine the target type carrier according to uplink carrier indication information issued by the base station, where the uplink carrier indication information is configured to inform the user equipment to initiate a random access request through a specified type of uplink carrier.

Figure 11:
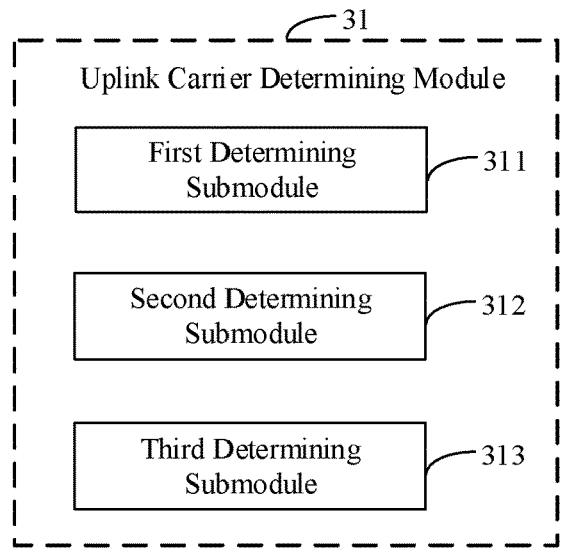
FIG. 11 is a block diagram illustrating another apparatus for controlling network access according to an example of the present disclosure.

Refer to a block diagram illustrating another apparatus for controlling network access according to an example shown in FIG. 11. On the basis of the apparatus example shown in FIG. 9, if the user equipment is currently in a connected state, the uplink carrier determining module 31 can include any one of the following submodules:

a first determining submodule 311 configured to determine the target type carrier according to a reference signal received power (RSRP);

a second determining submodule 312 configured to determine the target type carrier according to uplink carrier indication information issued by the base station, where the uplink carrier indication information is configured to inform the user equipment to initiate a traffic request through a specified type of uplink carrier;

a third determining submodule 313 configured to determine the target type carrier according to latest historical scheduling information including uplink carrier grant information.

Figure 12:
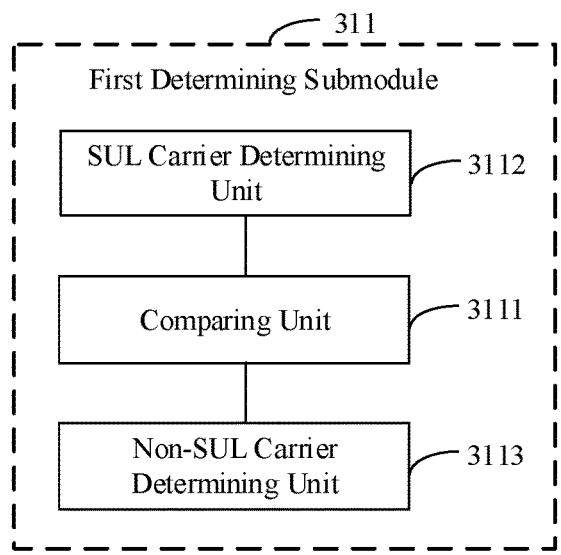
FIG. 12 is a block diagram illustrating another apparatus for controlling network access according to an example of the present disclosure.

Referring to the block diagram of another apparatus for controlling network access according to an example shown in FIG. 12, on the basis of the apparatus example shown in FIG. 10 or FIG. 11, the first determining submodule 311 can include:

a comparing unit 3111 configured to compare a detected RSRP with a preset power threshold;

a SUL carrier determining unit 3112 configured to determine the SUL carrier as the target type carrier when the RSRP is less than the preset power threshold;

a non-SUL carrier determining unit 3113 configured to determine the non-SUL carrier as the target type carrier when the RSRP is greater than or equal to the preset power threshold.

Figure 13:
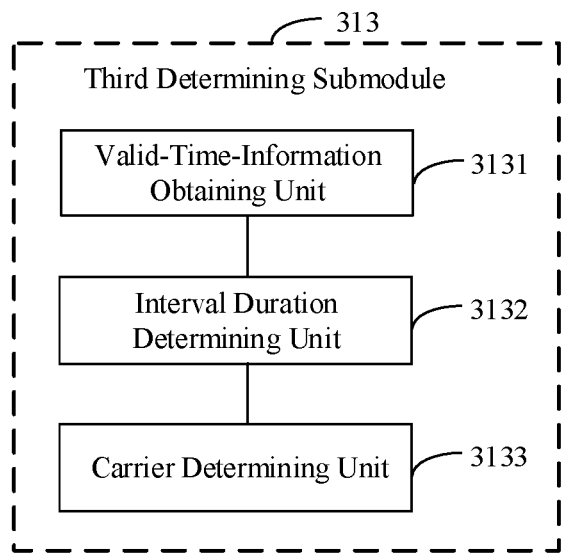
FIG. 13 is a block diagram illustrating another apparatus for controlling network access according to an example of the present disclosure.

Referring to a block diagram of another apparatus for controlling network access according to an example shown in FIG. 13, on the basis of the apparatus example shown in FIG. 11, the third determining submodule 313 can include:

a valid-time-information obtaining unit 3131 configured to obtain an effective time duration of the historical scheduling information;

an interval duration determining unit 3132 configured to determine an interval duration between a current time and a receiving time of the historical scheduling information;

a carrier determining unit 3133 configured to, in response to that the interval duration is shorter than the effective time duration, determine the target type carrier according to the uplink carrier grant information in the historical scheduling information.

Figure 14:
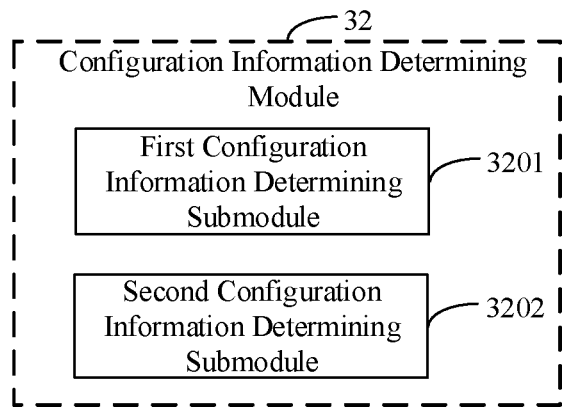
FIG. 14 is a block diagram illustrating another apparatus for controlling network access according to an example of the present disclosure.

Referring to a block diagram of another apparatus for controlling network access according to an example shown in FIG. 14, based on the apparatus example shown in FIG. 9, the configuration information determining module 32 can include:

a first configuration information determining submodule 3201 configured to obtain first AC configuration information applicable to the non-SUL carrier when the target type carrier is the non-SUL carrier;

a second configuration information determining submodule 3202 configured to obtain second AC configuration information applicable to the SUL carrier when the target type carrier is the SUL carrier.

Figure 15:
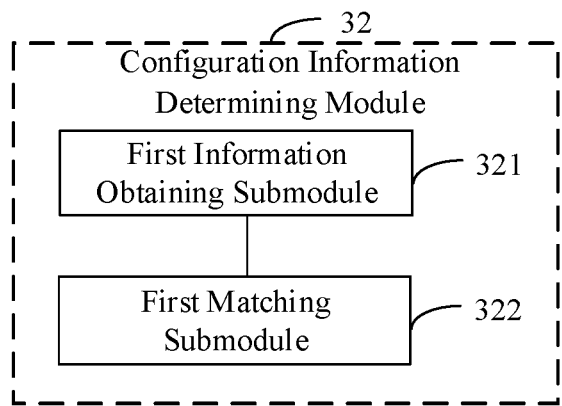
FIG. 15 is a block diagram illustrating another apparatus for controlling network access according to an example of the present disclosure.

Referring to a block diagram of another apparatus for controlling network access according to an example shown in FIG. 15, on the basis of the apparatus example shown in FIG. 9, the configuration information determining module 32 can include:

a first information obtaining submodule 321 configured to obtain two independently configured AC configuration lists from two different messages or a same message issued by the base station, where each of the AC configuration lists includes: a correspondence between preset uplink carrier information and AC configuration information;

a first matching submodule 322 configured to determine the target AC configuration information applicable to the target type carrier by matching the two AC configuration lists against the target type carrier.

Figure 16:
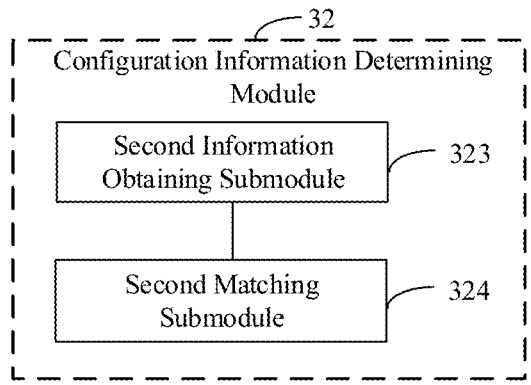
FIG. 16 is a block diagram illustrating another apparatus for controlling network access according to an example of the present disclosure.

Referring to a block diagram of another apparatus for controlling network access according to an example shown in FIG. 16, on the basis of the apparatus example shown in FIG. 9, the configuration information determining module 32 can include:

a second information obtaining submodule 323 configured to obtain public AC configuration information and carrier applicable information issued by the base station, where the carrier applicable information is configured to indicate an uplink carrier applicable condition of each piece of sub-configuration information in the public AC configuration information, and the carrier applicable information includes at least an applicable carrier type;

a second matching submodule 324 configured to determine the target AC configuration information applicable to the target type carrier by matching the carrier applicable information of each piece of sub-configuration information against the target type carrier.

In another apparatus example of the present disclosure, the carrier applicable information can further include: an effective time range indicating an allowable time range in which the sub-configuration information is applicable to a preset uplink carrier.

Figure 17:
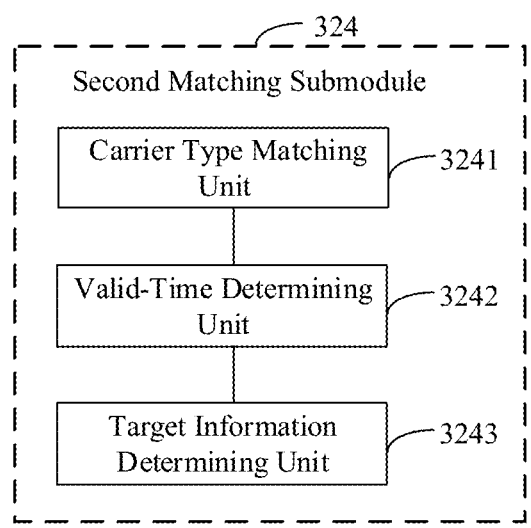
FIG. 17 is a block diagram illustrating an apparatus for controlling network access according to an example of the present disclosure.

Referring to a block diagram of another apparatus for controlling network access according to an example shown in FIG. 17, on the basis of the apparatus example shown in FIG. 16, the second matching submodule 324 can include:

a carrier type matching unit 3241 configured to match the applicable carrier type of each piece of sub-configuration information against the target type carrier;

a valid-time determining unit 3242 configured to determine whether a current time is within the effective time range when the target type carrier belongs to the applicable carrier type of one piece of sub-configuration information;

a target information determining unit 3243 configured to determine that the sub-configuration information belongs to the target AC configuration information when the current time is within the effective time range.

Corresponding to the above method for controlling network access on the base station side, the present disclosure provides an apparatus for controlling network access, which is provided in the base station. Referring to a block diagram of an apparatus for controlling network access according to an example shown in FIG. 18, the apparatus can include:

an information configuration module 41 configured to determine an access control (AC) configuration information applicable to a supplementary uplink (SUL) carrier and a non-SUL carrier, where the AC configuration information includes first AC configuration information applicable to the non-SUL carrier, and second AC configuration information applicable to the SUL carrier;

a sending module 42 configured to send the AC configuration information to the user equipment to enable the user equipment to determine target AC configuration information according to a target type carrier for carrying traffic to be transmitted and perform an AC process based on the target AC configuration information.

Figure 18:
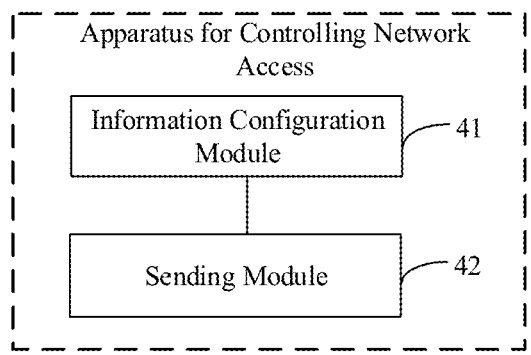
FIG. 18 is a block diagram illustrating an apparatus for controlling network access according to an example of the present disclosure.
Figure 19:
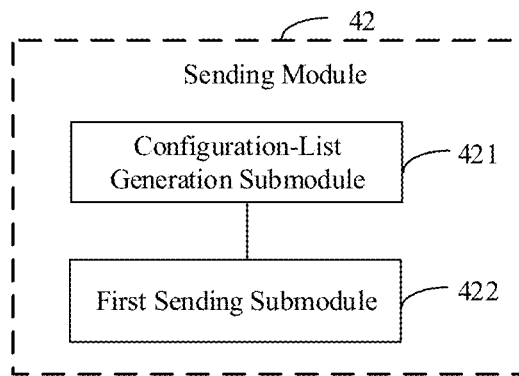
FIG. 19 is a block diagram illustrating another apparatus for controlling network access according to an example of the present disclosure.

Referring to a block diagram of another apparatus for controlling network access according to an example shown in FIG. 19, based on the apparatus example shown in FIG. 18, the sending module 42 can include:

a configuration-list generation submodule 421 configured to generate two independently-configured AC configuration lists according to the first access control configuration information and the second access control configuration information, where each of the AC configuration lists includes: a correspondence between preset uplink carrier information and AC configuration information;

a first sending submodule 422 configured to send the two independently-configured AC configuration lists to the user equipment through two messages or one message.

Figure 20:
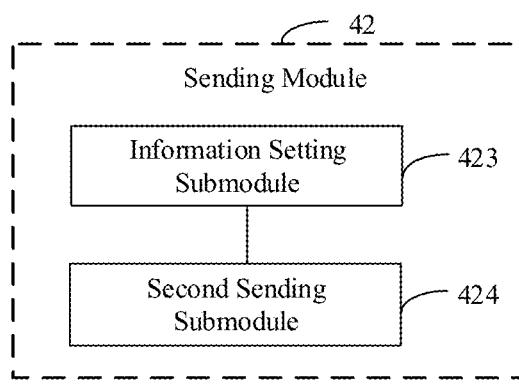
FIG. 20 is a block diagram illustrating another apparatus for controlling network access according to an example of the present disclosure.

Referring to the block diagram of another apparatus for controlling network access according to an example shown in FIG. 20, based on the apparatus example shown in FIG. 18, the sending module can include:

an information setting submodule 423 configured to provide public AC configuration information and carrier applicable information according to the first AC configuration information and the second AC configuration information, where the carrier applicable information is configured to indicate an uplink carrier applicable condition of each piece of sub-configuration information in the public AC configuration information, and the carrier applicable information includes at least an applicable carrier type.

In another apparatus example of the present disclosure, the carrier applicable information further includes: an effective time range indicating an allowable time range in which the sub-configuration information is applicable to a preset uplink carrier.

A second sending submodule 424 is configured to send the public AC configuration information and the carrier applicable information to the user equipment, to enable the user equipment to respectively determine first AC configuration information applicable to the non-SUL carrier and second AC configuration information applicable to the SUL carrier based on the public AC configuration information and the carrier applicable information.

Figure 21:
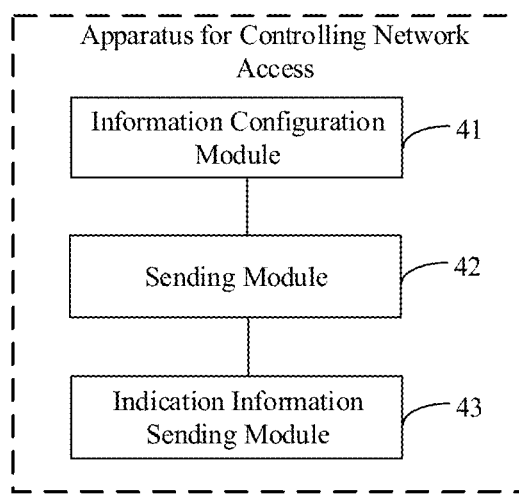
FIG. 21 is a block diagram illustrating another apparatus for controlling network access according to an example of the present disclosure.

Referring to a block diagram of another apparatus for controlling network access according to an example shown in FIG. 21, based on the apparatus example shown in FIG. 18, the apparatus can further include:

an indication information sending module 43 configured to send uplink carrier indication information to the user equipment, where the uplink carrier indication information is configured to inform the user equipment to initiate a network access request through a specified type of uplink carrier, where the specified type of uplink carrier is a SUL carrier or a non-SUL carrier.

As for the apparatus example, since it basically corresponds to the method example, reference can be made to the relevant part of the description of the method example. The apparatus examples described above are merely illustrative, and the units described above as separate components can or cannot be physically separated, and the components displayed as units can or cannot be physical units. That is, they can be located in one location, or it can be distributed to multiple network units. Some or all of the modules can be selected according to actual needs to achieve the objectives of the solutions of the present disclosure. Those of ordinary skill in the art can understand and implement it without creative work.

Correspondingly, on the one hand, an apparatus for controlling network access is provided, including: a processor;

and a memory for storing executable instructions of the processor; wherein the processor is configured to:

determine a target type carrier carrying traffic to be transmitted when a traffic request is to be initiated, where the target type carrier includes: a supplementary uplink (SUL) carrier, or a non-SUL carrier;

determine target access control (AC) configuration information applicable to the target type carrier according to AC configuration information issued by the base station;

determine whether the user equipment is allowed to perform an AC process through the target uplink carrier by matching the target AC configuration information against access detection information of the user equipment.

Another aspect provides an apparatus for controlling network access, including: a processor; and a memory for storing executable instructions of the processor; wherein the processor is configured to:

determine access control (AC) configuration information applicable to a supplementary uplink (SUL) carrier and a non-SUL carrier;

send the AC configuration information to the user equipment, to enable the user equipment to determine target AC configuration information according to a target type carrier for carrying traffic to be transmitted and perform an AC process based on the target AC configuration information.

Figure 22:
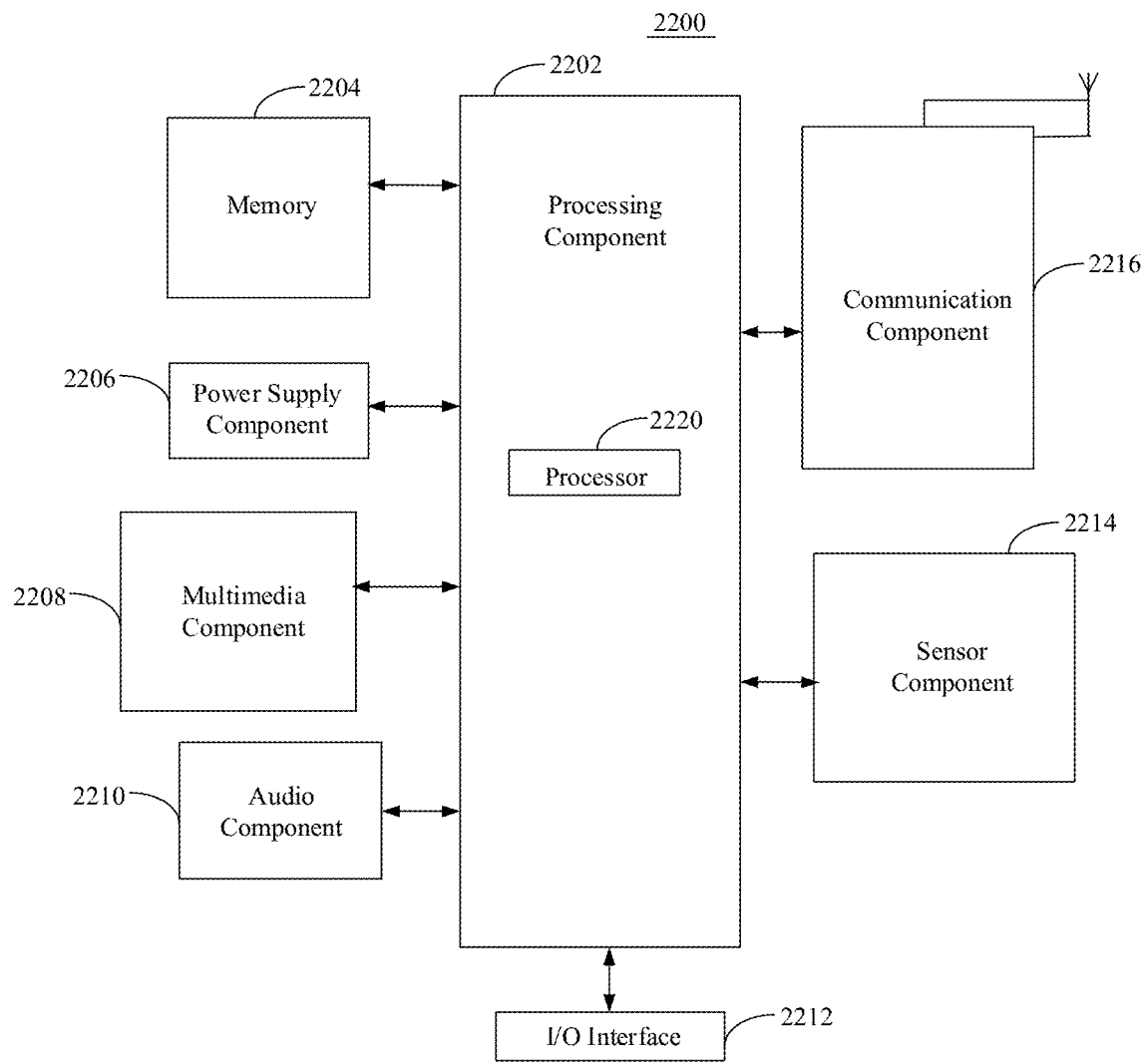
FIG. 22 is a schematic structural diagram of an apparatus for controlling network access according to an example of the present disclosure.

FIG. 22 is a block diagram illustrating an apparatus 2200 for controlling network access according to an example. For example, the apparatus 2200 can be user equipment such as a mobile phone, a computer, a digital broadcasting terminal, a messaging device, a game console, a tablet device, a medical device, fitness equipment, a personal digital assistant, or a wearable device such as a smart watch, smart glasses, a smart wristband, smart sneakers, or the like.

As shown in FIG. 22, the apparatus 2200 can include one or more of the following components: a processing component 2202, a memory 2204, a power supply component 2206, a multimedia component 2208, an audio component 2210, an input/output (I/O) interface 2212, a sensor component 2214, and a communication component 2216.

The processing component 2202 generally controls overall operations of the apparatus 2200, such as operations associated with display, phone calls, data communications, camera operations, and recording operations. The processing component 2202 can include one or more processors 2220 to execute instructions to complete all or part of the steps of the above methods. In addition, the processing component 2202 can include one or more modules which facilitate the interaction between the processing component 2202 and other components. For example, the processing component 2202 can include a multimedia module to facilitate the interaction between the multimedia component 2208 and the processing component 2202.

The memory 2204 is configured to store various types of data to support the operation of the apparatus 2200. Examples of such data include instructions for any application or method operated on the apparatus 2200, contact data, phonebook data, messages, pictures, videos, and so on. The memory 2204 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2206 supplies power for different components of the apparatus 2200. The power supply component 2206 can include a power supply management system, one or more power supplies, and other components associated with generating, managing and distributing power for the apparatus 2200.

The multimedia component 2208 includes a screen providing an output interface between the apparatus 2200 and a user. In some examples, the screen can include a Liquid Crystal Display (LCD) and a Touch Panel (TP). If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 2208 can include a front camera and/or a rear camera. The front camera and/or rear camera can receive external multimedia data when the apparatus 2200 is in an operating mode, such as a photographing mode or a video mode. Each of the front camera and the rear camera can be a fixed optical lens system or have focal length and optical zooming capability.

The audio component 2210 is configured to output and/or input an audio signal. For example, the audio component 2210 includes a microphone (MIC). When the apparatus 2200 is in an operating mode, such as a call mode, a record mode and a voice recognition mode, the microphone is configured to receive an external audio signal. The received audio signal can be further stored in the memory 2204 or sent via the communication component 2216. In some examples, the audio component 2210 further includes a speaker for outputting an audio signal.

The I/O interface 2212 provides an interface between the processing component 2202 and a peripheral interface module. The above peripheral interface module can be a keyboard, a click wheel, buttons, or the like. These buttons can include but not limited to, a home button, a volume button, a start button and a lock button.

The sensor component 2214 includes one or more sensors to provide status assessments of various aspects for the apparatus 2200. For example, the sensor component 2214 can detect the on/off status of the apparatus 2200, and relative positioning of component, for example, the component is a display and a keypad of the apparatus 2200. The sensor component 2214 can also detect a change in position of the apparatus 2200 or a component of the apparatus 2200, a presence or absence of the contact between a user and the apparatus 2200, an orientation or an acceleration/deceleration of the apparatus 2200, and a change in temperature of the apparatus 2200. The sensor component 2214 can include a proximity sensor configured to detect the presence of a nearby object without any physical contact. The sensor component 2214 can further include an optical sensor, such as a Complementary Metal-Oxide-Semiconductor (CMOS) or Charged Coupled Device (CCD) image sensor which is used in imaging applications. In some examples, the sensor component 2214 can further include an acceleration sensor, a gyroscope sensor, a magnetic sensor, a pressure sensor, or a temperature sensor.

The communication component 2216 is configured to facilitate wired or wireless communication between the apparatus 2200 and other devices. The apparatus 2200 can access a wireless network based on a communication standard, such as Wi-Fi, 2G or 3G, or a combination thereof. In an example, the communication component 2216 receives a broadcast signal or broadcast related information from an external broadcast management system via a broadcast channel. In an example, the communication component 2216 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the apparatus 2200 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, a non-transitory computer readable storage medium including instructions is further provided, such as the memory 2204 including instructions. The above instructions can be executed by the processor 2220 of the apparatus 2200 to complete the method for controlling network access illustrated in any of FIG. 2-FIG. 6. For example, the non-transitory computer readable storage medium can be a Read-Only Memory (ROM), a Random Access Memory (RAM), a CD-ROM, a magnetic tape, a floppy disk, an optical data storage device, and so on.

Figure 23:
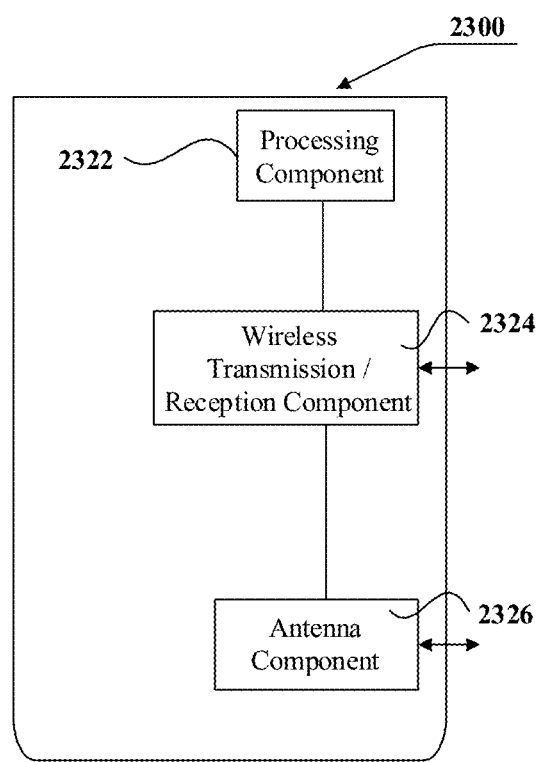
FIG. 23 is a schematic structural diagram of another apparatus for controlling network access according to an example of the present disclosure.

FIG. 23 is a block diagram illustrating an apparatus 2300 for controlling network access according to an exemplary embodiment. The apparatus 2300 can be a base station. Referring to FIG. 23, the apparatus 2300 includes a processing component 2322, a wireless transmission/reception component 2324, an antenna component 2326, and a signal processing part unique to the wireless interface. The processing component 2322 may further include one or more processors.

One processor of the processing component 2322 can be configured to:

determine access control (AC) configuration information applicable to a supplementary uplink (SUL) carrier and a non-SUL carrier, where the AC configuration information includes first AC configuration information applicable to the non-SUL carrier, and second AC configuration information applicable to the SUL carrier;

send the AC configuration information to the user equipment, to enable the user equipment to determine target AC configuration information according to a target type carrier for carrying traffic to be transmitted and perform an AC process based on the target AC configuration information In an example, a non-transitory computer-readable storage medium including instructions is provided, the instructions can be executed by one processor of the processing component 2322 to complete the method for controlling network access illustrated in any of FIG. 7-FIG. 9. For example, the non-transitory computer-readable storage medium can be a ROM, a random access memory (RAM), a CD-ROM, a magnetic tape, a floppy disk, an optical data storage device, or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A method for controlling network access, applicable to user equipment, comprising:
determining a target type carrier carrying traffic to be transmitted when a traffic request is to be initiated, wherein the target type carrier comprises: a supplementary uplink (SUL) carrier, or a non-SUL carrier;
determining target access control (AC) configuration information applicable to the target type carrier according to AC configuration information issued by a base station; and
determining whether the user equipment is allowed to perform an AC process through the target uplink carrier by matching the target AC configuration information against access detection information of the user equipment;
wherein in response to that the user equipment is currently in a connected state, determining the target type carrier by performing at least one of the following acts:
determining the target type carrier according to latest historical scheduling information comprising uplink carrier grant information;
determining the target type carrier according to a reference signal received power (RSRP); or
determining the target type carrier according to uplink carrier indication information issued by the base station, wherein the uplink carrier indication information is configured to inform the user equipment to initiate a traffic request through a specified type of uplink carrier; and
wherein determining the target type carrier according to the latest historical scheduling information comprises:
obtaining an effective time duration of the historical scheduling information;
determining an interval duration between a current time and a receiving time of the historical scheduling information; and
determining the target type carrier according to the uplink carrier grant information in the historical scheduling information in response to that the interval duration is shorter than the effective time duration.

2. The method according to claim 1, wherein in response to that the user equipment is currently in one of following states: an inactive state, idle state, or out-of-synchronization state in a connected state, determining the target type carrier carrying traffic to be transmitted comprising:
determining the target type carrier according to a reference signal received power (RSRP); or,
determining the target type carrier according to uplink carrier indication information issued by the base station, wherein the uplink carrier indication information is configured to inform the user equipment to initiate a random access request through a specified type of uplink carrier.

3. The method according to claim 2, wherein determining the target type carrier according to the RSRP comprises:
comparing a detected RSRP with a preset power threshold;
determining the SUL carrier as the target type carrier when the RSRP is less than the preset power threshold; and determining the non-SUL carrier as the target type carrier when the RSRP is greater than or equal to the preset power threshold.

4. The method according to claim 1, wherein determining the target AC configuration information applicable to the target type carrier comprises:
obtaining first AC configuration information applicable to the non-SUL carrier when the target type carrier is the non-SUL carrier; and
obtaining second AC configuration information applicable to the SUL carrier when the target type carrier is the SUL carrier.

5. The method according to claim 1, wherein determining the target AC configuration information applicable to the target type carrier according to the AC configuration information issued by the base station comprises:
obtaining two independently-configured AC configuration lists from two different messages or a same message issued by the base station, wherein each of the AC configuration lists comprises: a correspondence between preset uplink carrier information and AC configuration information; and
determining the target AC configuration information applicable to the target type carrier by matching the two AC configuration lists against the target type carrier.

6. The method according to claim 1, wherein determining the target AC configuration information applicable to the target type carrier according to the AC configuration information issued by the base station comprises:
obtaining public AC configuration information and carrier applicable information issued by the base station, wherein the carrier applicable information is configured to indicate an uplink carrier applicable condition of each piece of sub-configuration information in the public AC configuration information, and the carrier applicable information comprises at least an applicable carrier type; and
determining the target AC configuration information applicable to the target type carrier by matching the carrier applicable information of each piece of sub-configuration information against the target type carrier.

7. The method according to claim 6, wherein the carrier applicable information further comprises: an effective time range configured to indicate an allowable time range in which the sub-configuration information is applicable to a preset uplink carrier; and
determining the target AC configuration information applicable to the target type carrier by matching the carrier applicable information of each piece of sub-configuration information against the target type carrier comprises:
matching the applicable carrier type of each piece of sub-configuration information against the target type carrier;
determining whether a current time is within the effective time range when the target type carrier belongs to the applicable carrier type of one piece of sub-configuration information; and
determining that the sub-configuration information belongs to the target AC configuration information when the current time is within the effective time range.

8. A method for controlling network access, applicable to a base station, comprising:
determining access control (AC) configuration information applicable to a supplementary uplink (SUL) carrier and a non-SUL carrier, wherein the AC configuration information comprises first AC configuration information applicable to the non-SUL carrier, and second AC configuration information applicable to the SUL carrier; and
sending the AC configuration information to user equipment to enable the user equipment to determine target AC configuration information according to a target type carrier for carrying traffic to be transmitted and perform an AC process based on the target AC configuration information;
wherein the method further comprises at least one of:
sending uplink carrier indication information to the user equipment, wherein the uplink carrier indication information is configured to inform the user equipment to initiate a random access request through a specified type of uplink carrier, so that the user equipment determines the target type carrier according to the uplink carrier indication information; or
sending historical scheduling information comprising uplink carrier grant information and an effective time duration of the historical scheduling information to the user equipment, so that the user equipment obtains the effective time duration of the historical scheduling information, determines an interval duration between a current time and a receiving time of the historical scheduling information; and determines the target type carrier according to the uplink carrier grant information in the historical scheduling information in response to that the interval duration is shorter than the effective time duration.

9. The method according to claim 8, wherein sending the AC configuration information to the user equipment comprises:
generating two independently-configured AC configuration lists according to the first access control configuration information and the second access control configuration information, wherein each of the AC configuration lists comprises: a correspondence between preset uplink carrier information and AC configuration information; and
sending the two independently-configured AC configuration lists to the user equipment through two messages or one message.

10. The method according to claim 8, wherein sending the AC configuration information to the user equipment comprises:
providing public AC configuration information and carrier applicable information according to the first AC configuration information and the second AC configuration information, wherein the carrier applicable information is configured to indicate an uplink carrier applicable condition of each piece of sub-configuration information in the public AC configuration information, and the carrier applicable information comprises at least an applicable carrier type; and
sending the public AC configuration information and the carrier applicable information to the user equipment to enable the user equipment to respectively determine first AC configuration information applicable to the non-SUL carrier and second AC configuration information applicable to the SUL carrier based on the public AC configuration information and the carrier applicable information.

11. The method according to claim 10, wherein the carrier applicable information further comprises: an effective time range indicating an allowable time range in which the sub-configuration information is applicable to a preset uplink carrier.

12. An apparatus for controlling network access, comprising:

a processor; and a memory for storing processor executable instructions;

wherein the processor is configured to:

determine a target type carrier carrying traffic to be transmitted when a traffic request is to be initiated, wherein the target type carrier comprises: a supplementary uplink (SUL) carrier, or a non-SUL carrier;

determine target access control (AC) configuration information applicable to the target type carrier according to AC configuration information issued by a base station; and determine whether the user equipment is allowed to perform an AC process through the target uplink carrier by matching the target AC configuration information against access detection information of the user equipment;

wherein in response to that the user equipment is currently in a connected state, the processor is configured to determine the target type carrier by performing at least one of the following acts:

determining the target type carrier according to latest historical scheduling information comprising uplink carrier grant information;

determining the target type carrier according to a reference signal received power (RSRP); or determining the target type carrier according to uplink carrier indication information issued by the base station, wherein the uplink carrier indication information is configured to inform the user equipment to initiate a traffic request through a specified type of uplink carrier; and wherein determining the target type carrier according to the latest historical scheduling information comprises:

obtaining an effective time duration of the historical scheduling information;

determining an interval duration between a current time and a receiving time of the historical scheduling information; and determining the target type carrier according to the uplink carrier grant information in the historical scheduling information in response to that the interval duration is shorter than the effective time duration.

13. The apparatus according to claim 12, wherein in response to that the user equipment is currently in any one of an inactive state, idle state, or out-of-synchronization state in a connected state, when determining the target type carrier carrying traffic to be transmitted, the processor is further configured to:

determine the target type carrier according to a reference signal received power (RSRP); or, determine the target type carrier according to uplink carrier indication information issued by the base station, wherein the uplink carrier indication information is configured to inform the user equipment to initiate a random access request through a specified type of uplink carrier.

14. The apparatus according to claim 13, wherein when determining the target type carrier according to the RSRP, the processor is further configured to:

compare a detected RSRP with a preset power threshold;

determine the SUL carrier as the target type carrier when the RSRP is less than the preset power threshold; and determine the non-SUL carrier as the target type carrier when the RSRP is greater than or equal to the preset power threshold.

15. The apparatus according to claim 12, wherein when determining the target AC configuration information applicable to the target type carrier, the processor is further configured to:

obtain first AC configuration information applicable to the non-SUL carrier when the target type carrier is the non-SUL carrier; and obtain second AC configuration information applicable to the SUL carrier when the target type carrier is the SUL carrier.

* * * * *